US012487484B2

(12) United States Patent
Ma (10) Patent No.: US 12,487,484 B2
(45) Date of Patent: Dec. 2, 2025

(54) DEVICE AND METHOD FOR AMPLITUDE AND FREQUENCY BASED REGULATION OF A GLASS FUNCTIONAL LAYER (71) Applicant: SAINT-GOBAIN GLASS FRANCE, Courbevoie (FR)

(72) Inventor: Siteng Ma, Shanghai (CN)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 581 days.

(21) Appl. No.: 17/779,417

(22) PCT Filed: Nov. 25, 2020

(86) PCT No.: PCT/CN2020/131523
§ 371 (c)(1),
(2) Date: May 24, 2022

(87) PCT Pub. No.: WO2021/104313
PCT Pub. Date: Jun. 3, 2021

(65) Prior Publication Data
US 2023/0004030 A1    Jan. 5, 2023

(30) Foreign Application Priority Data
Nov. 27, 2019    (CN) .......................... 201911185264.8

(51) Int. Cl.
*G02F 1/1334*    (2006.01)
*G02F 1/133*    (2006.01)
(Continued)

(52) U.S. Cl.
CPC ........ *G02F 1/1334* (2013.01); *G02F 1/13306* (2013.01); *G02F 1/137* (2013.01);
(Continued)

(58) Field of Classification Search
CPC ............................ G02F 1/13306; G02F 1/163
See application file for complete search history.

(56) References Cited

U.S. PATENT DOCUMENTS

2010/0188057 A1    7/2010    Tarng
2016/0054634 A1    2/2016    Brown et al.
(Continued)

FOREIGN PATENT DOCUMENTS

CN    101707892 A    5/2010
CN    103492940 B    2/2017
(Continued)

OTHER PUBLICATIONS

Notice of Reasons for Refusal as issued in Japanese Patent Application No. 2022-530966, dated Jun. 20, 2023.
(Continued)

*Primary Examiner* — Lauren Nguyen
(74) *Attorney, Agent, or Firm* — Pillsbury Winthrop Shaw Pittman LLP (57) ABSTRACT

A regulating device includes a voltage regulator configured to receive an input voltage and regulate an amplitude and a frequency of the input voltage to generate an electrical signal acting on the electric control functional layer; and a controller coupled to the voltage regulator and configured to receive a regulating signal, and to send a control signal to the voltage regulator according to the regulating signal to regulate the amplitude and the frequency of the input voltage, the control signal including an amplitude parameter and a frequency parameter of the voltage. Finer regulation of the optical characteristics of the electric control functional layer can be realized by introducing frequency regulation. Such finer regulation can bring about a more comfortable experience to human senses. At the same time, the realization of
(Continued)

such fine regulation enables more diversified control of the electronic control function layer.

25 Claims, 4 Drawing Sheets

(51) Int. Cl.
*G02F 1/137* (2006.01)
*G02F 1/163* (2006.01)
*G05F 1/46* (2006.01)
*H02M 7/5387* (2007.01)

(52) U.S. Cl.
CPC ............... *G02F 1/163* (2013.01); *G05F 1/46* (2013.01); *H02M 7/5387* (2013.01)

(56) References Cited

U.S. PATENT DOCUMENTS

| | | | |
|---|---|---|---|
| 2017/0131610 A1* | 5/2017 | Brown | G02F 1/163 |
| 2018/0267341 A1* | 9/2018 | Akutagawa | C09K 19/50 |
| 2020/0133042 A1 | 4/2020 | Manz et al. | |
| 2020/0233279 A1 | 7/2020 | Kikuchi et al. | |

FOREIGN PATENT DOCUMENTS

| | | |
|---|---|---|
| CN | 109031734 A | 12/2018 |
| CN | 110471232 A | 11/2019 |
| CN | 111929932 A | 11/2020 |
| JP | 2009-500803 A | 1/2009 |
| JP | 2011-137873 A | 7/2011 |
| JP | 2013-228646 A | 11/2013 |
| JP | 2019-502145 A | 1/2019 |
| WO | WO 2017/075059 A1 | 5/2017 |
| WO | WO 2019/011891 A1 | 1/2019 |
| WO | WO 2019/031606 A1 | 2/2019 |

OTHER PUBLICATIONS

Decision of Refusal as issued in Japanese Patent Application No. 2022-530966, dated Oct. 17, 2023.
International Search Report as issued in International Patent Application No. PCT/CN2020/131523, Mar. 3, 2021.
DR Office Action as issued in Korean Patent Application No. 10-2022-7017404, dated Oct. 17, 2024.
Request for the Submission of an Opinion as issued in Korean Patent Application No. 10-2022-7017404, dated Apr. 28, 2025.

* cited by examiner

DEVICE AND METHOD FOR AMPLITUDE AND FREQUENCY BASED REGULATION OF A GLASS FUNCTIONAL LAYER

CROSS-REFERENCE TO RELATED APPLICATIONS

This application is the U.S. National Stage of PCT/CN2020/131523, filed Nov. 25, 2020, which in turn claims priority to Chinese patent application number 201911185264.8 filed Nov. 27, 2019. The content of these applications are incorporated herein by reference in their entireties.

FIELD

Embodiments of the present disclosure relate to a regulating device, and more specifically, to a regulating device for regulating an electric control functional layer, a regulating method, and a functional glass.

BACKGROUND

In pace with the continuous development of industry (e.g. auto industry), there arises a need for integrating more and more functions in glass. For example, some automobile glass is integrated with a color-changing or a transparency-regulating function to regulate a color and transparency of glass according to a user's instruction or a change of the ambient environment (e.g., temperature, light intensity or the like). There is also some glass integrated with the functions such as lighting, display, heating, communication, host-guest interaction, or the like. For the glass integrated with a function of regulating a color or transparency, currently some automobile glass uses an electric control functional layer arranged in a laminated glass to form a functional glass. Since the electric control functional layer for example based on an electrochromic material, an electro-induced transparency-changing material or a host-guest liquid crystal material has characteristics such as electrochromic or electro-induced transparency-changing, the transparency and/or color of the functional glass using the electric control functional layer can be regulated by regulating the voltage applied to the electric control functional layer, to achieve a purpose such as privacy protection.

Conventional electric control functional layers are mostly based on polymer dispersed liquid crystal (PDLC). The PDLC is liquid crystal with micron-sized droplets dispersed in an organic solid polymer substrate. Since the optical axes of the droplets composed of liquid crystal molecules are in free orientation, their refractive indices do not match the refractive index of the substrate. Upon passing through the substrate, light is strongly scattered by the droplets and presents an opaque milky white state or a translucent state. The orientations of optical axes of the liquid crystal droplets may be regulated by applying an electric field through a controller, and when the refractive indices of the liquid crystal droplets and the substrate match, the liquid crystal presents a transparent state. After the electric field is removed, the liquid crystal droplets present an initial light diffusion state, thereby displaying.

SUMMARY

Most of the traditional controllers regulate the electrical signal applied to the functional glass by regulating the amplitude of the voltage to thereby regulate the parameters such as optical characteristic of the functional glass. However, due to the characteristics of the liquid crystal particles to the voltage amplitude, the conventional solution has few such regulating options, and cannot achieve required regulating manners such as gradual regulation. Embodiments of the present disclosure provide a regulating device for regulating the electric control functional layer, which solves or at least partially solves the above-mentioned problems and other potential problems existing in the conventional regulating devices.

In the first aspect of the present disclosure, a regulating device for regulating an electric control functional layer is provided. The regulating device comprises a voltage regulator configured to receive an input voltage and regulate an amplitude and a frequency of the input voltage to generate an electrical signal acting on the electric control functional layer; and a controller coupled to the voltage regulator and configured to receive a regulating signal, and to send a control signal to the voltage regulator according to the regulating signal to regulate the amplitude and the frequency of the input voltage, the control signal including an amplitude parameter and a frequency parameter of the voltage.

In some embodiments, the control signal further comprises: at least one parameter of a waiting time parameter for the electric control functional layer to activate a transition or a transition rate parameter of the electric control functional layer.

In some embodiments, the voltage regulator comprises: a frequency regulating unit configured to regulate the frequency of the input voltage according to the frequency parameter to generate a regulated first intermediate voltage; and an amplitude regulating unit coupled to the frequency regulating unit and the electric control functional layer and configured to regulate an amplitude of the first intermediate voltage according to the amplitude parameter to generate an electric signal.

In some embodiments, the voltage regulator comprises: an amplitude regulating unit configured to regulate the amplitude of the input voltage according to the amplitude parameter to generate a regulated second intermediate voltage; and a frequency regulating unit coupled to the amplitude regulating unit and the electric control functional layer and configured to regulate a frequency of the second intermediate voltage according to the frequency parameter to generate an electric signal.

In some embodiments, the frequency regulating unit comprises: an H-bridge circuit; and a pulse width modulation circuit coupled to the H-bridge circuit and the controller and configured to control the switch in the H-bridge circuit according to frequency parameter to cause the H-bridge circuit to generate the first intermediate voltage based on the input voltage or to generate the electrical signal based on the second intermediate voltage.

In some embodiments, the amplitude regulating unit comprises: a converter; and a digital potentiometer coupled to the converter and the controller and configured to control the converter according to the amplitude parameter so that the converter generates the second intermediate voltage based on the input voltage or generates the electrical signal based on the first intermediate voltage.

In some embodiments, the electrical signal is used to regulate the optical characteristic of the electric control functional layer.

In some embodiments, the optical characteristic comprises at least one of haze, light transmittance, color, or degree of coloring.

In some embodiments, the regulating device further comprises an interaction unit coupled to the controller and configured to receive an instruction from a user and to provide a regulating signal to the controller according to the instruction from the user.

In some embodiments, the interaction unit comprises at least one of a touch device, a light sensor, a gesture sensor, a voice sensor, a regulating knob, an operating button or an operating handle.

In some embodiments, the pulse width modulation circuit is configured to cause a waveform output by the H-bridge circuit to comprise at least one of a square wave, a sine wave, a triangular wave or a trapezoidal wave.

In some embodiments, the regulating device further comprises an optical sensor configured to detect the optical characteristic of the electric control functional layer and to generate a detection signal representing the detected optical characteristic.

In some embodiments, the controller is coupled to the optical sensor and is further configured to determine an optical difference based on the detection signal and the regulating signal, and to control the voltage regulator based on the optical difference to further regulate at least one of the amplitude and the frequency.

In some embodiments, the optical sensor comprises a haze meter.

In the second aspect of the present disclosure, a method for regulating the electric control functional layer is provided. The method comprises receiving a regulating signal for regulating the electric control functional layer; and sending a control signal to the voltage regulator according to the regulating signal, to regulate the amplitude and frequency of the input voltage received by the voltage regulator so that the voltage regulator generates the electrical signal acting on the electric control functional layer, the control signal including an amplitude parameter and a frequency parameter of the voltage.

In some embodiments, controlling the voltage regulator according to the regulating signal comprises: controlling a frequency regulating unit to regulate the frequency of the input voltage to generate the regulated first intermediate voltage and controlling the amplitude regulating unit coupled to the frequency regulating unit and the electric control functional layer to regulate an amplitude of the first intermediate voltage to generate the electric signal.

In some embodiments, controlling the voltage regulator according to the regulating signal comprises: controlling an amplitude regulating unit to regulate the amplitude of the input voltage to generate the regulated second intermediate voltage; controlling a frequency regulating unit coupled to the amplitude regulating unit and the electric control functional layer to regulate a frequency of the second intermediate voltage to generate the electrical signal.

In some embodiments, controlling the frequency regulating unit comprises: controlling the pulse width modulation circuit coupled to the H-bridge circuit to control the switch in the H-bridge circuit according to the frequency parameter, so that the H-bridge circuit generates the first intermediate voltage based on the input voltage or generates the electric signal based on the second intermediate voltage.

In some embodiments, controlling the amplitude regulating unit comprises: controlling a digital potentiometer to control the converter according to the amplitude parameter, so that the converter generates the second intermediate voltage based on the input voltage or generates the electric signal based on the first intermediate voltage.

In some embodiments, receiving the regulating signal comprises receiving the regulating signal from the interaction unit, wherein the interaction unit is configured to receive an instruction from a user and to provide the regulating signal to the controller according to the instruction from the user.

In some embodiments, the method further comprises receiving a detection signal of the optical characteristic detected by the optical sensor; determining the optical difference based on the detection signal and the regulating signal; and controlling the voltage regulator based on the optical difference to further regulate at least one of the amplitude and the frequency.

According to a third aspect of the present disclosure, a functional glass is provided. The functional glass comprises a glass substrate; an electric control functional layer; and the regulating device according to the first aspect of the present disclosure.

In some embodiments, the electric control functional layer comprises at least one of an electrochromic material, an electro-induced transparency-changing material, or a host-guest liquid crystal material.

In some embodiments, the electro-induced transparency-changing material comprises one of suspended particle device, polymer dispersed liquid crystal, polymer network liquid crystal and polymer stabilized liquid crystal.

In some embodiments, the polymer in the electro-induced transparency-changing material is transparent or colored.

In some embodiments, at least one of the electrochromic material, the electro-induced transparency-changing material or the host-guest liquid crystal material is forward, reverse, or bistable.

It will be appreciated that the Summary part does not intend to indicate essential or important features of embodiments of the present disclosure or to limit the scope of the present disclosure. Other features of the present disclosure will be made apparent by the following description.

BRIEF DESCRIPTION OF THE DRAWINGS

The above and other objectives, features, and advantages of the present disclosure will become more apparent, through the following detailed description of the example embodiments of the present disclosure with reference to the accompanying drawings in which the same reference symbols generally refer to the same elements.

Throughout the drawings, the same or similar reference symbols refer to the same or similar elements.

DETAILED DESCRIPTION OF EMBODIMENTS

The present disclosure will now be described in detail with reference to several example embodiments. It should be appreciated that those embodiments of the present disclosure are provided to enable those skilled in the art to better understand and thus carry out the present disclosure, without suggesting any limitation to the scope of the technical solution of the present disclosure.

As used herein, the term "comprises" and its variants are to be read as open-ended terms that mean "comprises, but is not limited to." The term "based on" is to be read as "based at least in part on." The term "an embodiment" and "embodiments" are to be read as "at least one embodiment." The term "another embodiment" is to be read as "at least another embodiment." The terms "first," "second," and the like may refer to different or the same objects. Other definitions, either explicit or implicit, may be comprised below. Definitions of terms are consistent throughout the specification unless the context clearly indicates otherwise.

With the continuous development of technology, glass also needs to integrate various functions to meet people's needs. The glass as mentioned herein may refer to glass used in transportation vehicles (such as automobiles, trains, ships, airplanes, and aircrafts), display glass, or architectural glass. The following description will mainly take automobile glass as an example to describe the concept of the present disclosure. It should be appreciated that the glass used in other aspects is similar to automobile glass, and will not be described hereunder respectively.

At present, the glass integrated with various functions is generally referred to as a functional glass 200. A more common type of functional glass 200 is a dimming glass. Currently, most dimming glasses available on the market are integrally formed by placing a polymer dispersed liquid crystal (PDLC) layer between two layers of glass, and then forming a single piece by high temperature and high pressure integrally gluing.

The polymer dispersed liquid crystal layer comprises a polymer layer and liquid crystal droplets dispersed in the polymer layer. The polymer layer is made of a polymeric material. The polymer layer generally uses a material whose refractive index matches an ordinary refractive index of the liquid crystal droplets. The matching of refractive indices here means that the refractive index of the polymer layer is the same as the ordinary refractive index of the liquid crystal droplets (i.e., the refractive index of the liquid crystal droplets in a long-axis direction), or a ratio of the refractive index of the polymer layer to the ordinary refractive index of the liquid crystal droplets (i.e., the refractive index of the liquid crystal droplets in a long-axis direction) is in the range of 0.9 to 1.1.

Control electrodes are formed on surfaces of the two layers of glass facing the polymer dispersed liquid crystal layer. An electric field is formed in the polymer dispersed liquid crystal layer by applying a voltage to the control electrodes. Changes of the magnitude of the electric field may control the polymer dispersed liquid crystal layer to switch between a transparent state and an opaque state to achieve the purpose of dimming.

For example, in the PDLC system, nematic liquid crystal is uniformly dispersed in a solid organic polymer substrate in a form of micron-sized droplets. When no voltage is applied, the optical axis of each small liquid crystal droplet is in a preferred orientation, whereas the optical axes of all droplets are in a disorderly orientation state. Since liquid crystal is a material with strong optical and dielectric anisotropy, its effective refractive index does not match the refractive index of the substrate (with a large difference). At this time, the incident light can be strongly scattered and present an opaque or translucent milky white state, as shown on the left side of FIG. 1. When an external electric field is applied, the directions of the optical axes of the nematic liquid crystal molecules are uniformly along the direction of the electric field, and the ordinary refractive index of the liquid crystal droplets matches the refractive index of the substrate to a certain extent. The light may pass through the substrate and the substrate is in transparent or semi-transparent state, as shown on the right side of FIG. 1. After the external electric field is removed, the liquid crystal particles return to their original scattered state under the action of the elastic energy of the substrate. Therefore, the polymer dispersed liquid crystal film has an electric control optical switching property under the action of the electric field.

The light transmission performance may be characterized by haze for example. The "haze" refers to the scattering capability of light. Specifically, a haze value is a ratio of a luminous flux of scattering light deflecting from the incident light direction through samples to a luminous flux of transmitting light, expressed as a percentage. For example, the greater the haze value, the stronger the material's ability to scatter light, and the less clear people's eyes can see. The haze value shown in the left side of FIG. 2 described above is at the maximum.

In addition to the haze value, an important parameter describing optical characteristics such as light transmittance performance is light transmittance. Light transmittance is a physical term, which means a capacity of light passing through a medium, and a percentage of the luminous flux of light through a transparent or translucent body to the luminous flux of the incident light. That is to say, contrary to the haze, the higher the light transmittance, the more transparent the medium (e.g., the electric control functional layer). The lower the light transmittance, the less clear people's eyes can see.

Figure 2:
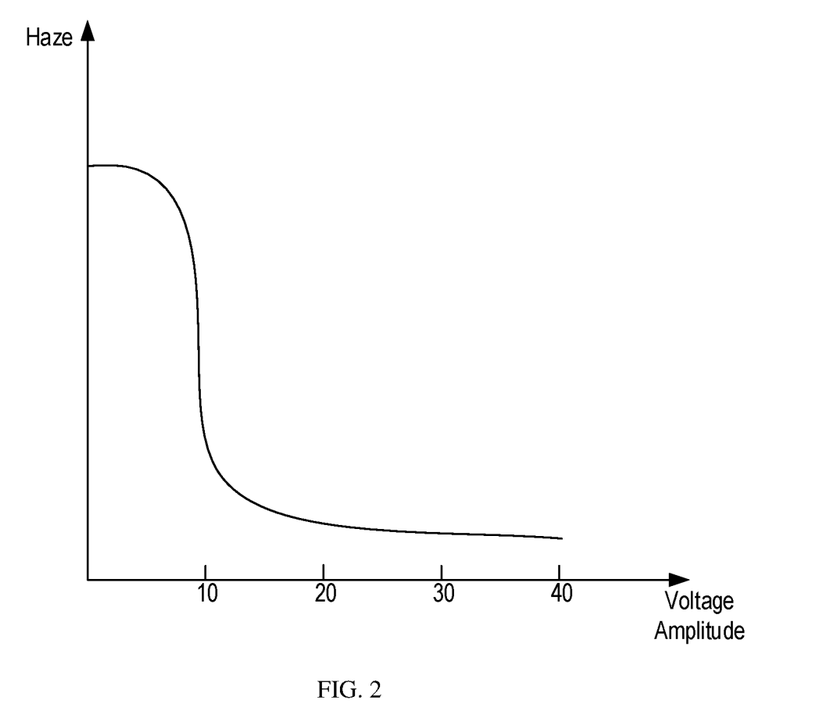
FIG. 2 illustrates a curve of changes of haze of the electric control functional layer along with a voltage amplitude.

Taking the haze as an example, the haze value of the electric control functional layer changes along with the amplitude of the voltage applied to the electric control functional layer. FIG. 2 schematically shows a case in which the haze changes along with the amplitude of the voltage applied to the electric control functional layer. The abscissa of FIG. 2 represents the amplitude of the applied voltage, and the ordinate represents the haze value. It may be seen that the change in haze with the applied voltage is not linear. For example, when the voltage value is between about 5V and 15V, the haze changes abruptly. However, when the applied voltage is below 5V and above 15V, the haze changes very slowly.

In the following, for ease of description, the concept of "transition rate" will be introduced. The transition rate refers to, for example, a degree of change in the optical characteristics per unit time when the optical characteristics are regulated. The greater the rate, the greater the change in optical characteristics such as the haze per unit time, as shown in a region between about 5V and 15V of FIG. 2. The smaller the rate is, the smaller the degree of optical characteristics changes with the electrical signal per unit time, as shown in regions below 5V and above 15V of FIG. 2.

One of the problems brought about by this is failure to more finely regulate the optical characteristics of a functional glass, thereby providing users with more regulating options to meet diverse needs of users. The required mode may comprise a gradual regulation mode or an abrupt-change regulation mode. For example, since the change curve of the haze with the amplitude of the voltage is the curve shown in FIG. 2, it is currently impossible to finely regulate the haze of the functional glass. For example, if the haze value needs to be regulated from 50% to 60%, the change of the voltage amplitude needs to be made very small. The regulation of such a very small voltage amplitude brings about a huge error, which makes it difficult to finely regulate the haze of the functional glass.

Through continuous research, the Inventor has discovered that in addition to the voltage amplitude, the frequency of the alternating current acting on the electric control functional layer 201 also affects the changes in the optical characteristics such as the haze of the functional glass. This brings an opportunity to finely regulate the optical characteristics and even other parameters of the functional glass 200.

Specifically, as shown in FIG. 2, regulating the amplitude of the voltage applied to the electric control functional layer 201 alone cannot achieve fine regulation of the electric control functional layer 201, such as providing more transparency regulating options. However, the Inventor has discovered that changes in frequency can also cause changes in parameters such as light transmittance and haze of the electric control functional layer 201. The Inventor has conducted further research on the simultaneous regulations of the amplitude and frequency of the voltage acting on the electric control functional layer 201.

Through further research, the Inventor proposes a regulating device 100 for regulating the electric control functional layer 201 to solve or at least partially solve the above or other potential problems in the prior art. With the obtained electrical signal of which the voltage amplitude and frequency are double-regulated by introducing the frequency regulating, the change curve of the haze relative to the electrical signal shown in FIG. 2 may be adjusted, that is, the change of the haze becomes gentle (the slope of the curve becomes smaller) relative to the change of electrical signal of which the voltage amplitude and frequency are double-regulated, so that the characteristics of the electric control functional layer 201 may be regulated more finely.

It should be appreciated that the electric control functional layer 201 mentioned herein is a layer whose some parameters will change by applying different electrical signals to the functional layer. For example, in some embodiments, the electrical signal may be used to regulate the optical characteristics of the electric control functional layer 201.

The electrical signal mentioned herein may refer to a voltage signal with a certain amplitude and frequency in some embodiments. The frequency here may be 0 in some embodiments, that is to say, the electrical signal may refer to a direct current electrical signal. In addition, in some embodiments, additionally or alternatively, the electrical signal may also refer to any one of a rising edge, a falling edge, a peak value, or a valley value in the voltage signal. That is, in some embodiments, the electric control functional layer 201 may also be regulated in response to the rising edge, the falling edge, the peak value, or the valley value of the voltage applied to the layer. For ease of description, the concept of the present disclosure will be mainly introduced below with an example where the electrical signal is alternating current. The situation where the electrical signal belongs to the rising edge, the falling edge, the peak value or the valley value of the voltage signal is similar to this, and will not be repeated in the following.

In addition to the above-mentioned regulation of transparency or haze, the regulating device according to embodiments of the present disclosure may further comprise regulating other optical characteristics including but not limited to color or degree of coloring. In other words, the electric control functional layer 201 may be a liquid crystal-based functional layer capable of changing optical characteristics such as light transmittance, haze, color, or degree of coloring. For example, the electric control functional layer may comprise one of an electrochromic (EC) material, an electro-induced transparency-changing material or a host-guest liquid crystal material in some embodiments.

For example, in some embodiments, the polymer in the electro-induced transparency-changing material may be transparent or colored. Dichroic dyes may be added to the polymer dispersed liquid crystal layer, so that the polymer dispersed liquid crystal layer appears colorful or black when no voltage is applied. Depending on types of dichroic dyes added, the polymer dispersed liquid crystal layer may present a variety of different colors, such as green and red, when no voltage is applied. When a voltage is applied to the electric control functional layer, the degree of coloring of color or black of the polymer dispersed liquid crystal layer decreases. As the voltage applied to the electric control functional layer 201 increases, the degree of coloring of the polymer dispersed liquid crystal layer gradually decreases, and tends to be colorless.

Certainly, it should be appreciated that the above-mentioned implementations of the change in the degree of coloring are only illustrative and are not intended to limit the scope of the present disclosure. Any other suitable way is also possible. For example, in some alternative embodiments, an electrochromic material may also be used for implementation. The electrochromic material refers to a material whose color may change under an action of external electric field and current. Its essence is that the chemical structure of the material changes under the action of the electric field, which in turn causes the change in the absorption spectrum of the material. According to the process of color change, the electrochromic material may be classified into irreversible color-changing materials with unidirectional color change, and reversible color-changing materials with more application value whose color may change in both directions.

In some alternative embodiments, the electric control functional layer 201 may further comprise a host-guest liquid crystal material. The host-guest liquid crystal material is a liquid crystal material based on the host-guest effect (also referred to as the guest-host effect). The host-guest effect is an effect taking dichroic dyes with different absorptions of visible light along the long axis direction and the short axis direction as the guest, dissolved in the aligned liquid crystal host. The dichroic dye molecules (guest) will be arranged in the same direction as the nematic liquid crystal molecules (host) in a way that "the guest changes with the host". When the arrangement of the liquid crystal molecules as the host changes under the action of the electric field, the arrangement direction of the dichroic dye molecules will also change accordingly, that is, the absorption of incident light by the dichroic dye will also change. That is to say, with the effect of re-arrangement of polychromatic dye molecules (guest) and nematic liquid crystal molecules (host) under the action of the electric field to cause color changes, the regulating of colors is enabled through the difference of the electrical signal acting on the electric control functional layer based on the host-guest liquid crystal.

Additionally or alternatively, in addition to the above-mentioned parameters related to optical characteristics that can be regulated, the parameters of the electric control functional layer 201 that can be regulated may further comprise other various suitable parameters such as parameters for changing the heating intensity, luminous intensity through electric control, or parameters related to communication, display or host-guest interaction. For example, in some embodiments, the electric control functional layer 201 may also be a heating functional layer or a light emitting functional layer. The heating intensity of the heating functional layer or the luminescence intensity of the light-emitting functional layer is regulated more finely by controlling the electric control functional layer 201.

Hereinafter, the concept of the present disclosure will be described by taking the regulation of optical characteristics such as light transmittance, haze, color, or degree of coloring of the electric control functional layer 201 as an example. Regarding the regulation of other parameters of the electric control functional layer 201 such as parameters of the heating intensity and luminous intensity, or parameters related to communication, display or host-guest interaction, the principle is the same and will not be repeated in the following.

In some embodiments, the electro-induced transparency-changing material may comprise one of the following types: suspended particle device (SPD), polymer dispersed liquid crystal (PDLC), polymer network liquid crystal (PNLC), or polymer stabilized liquid crystal (PSLC). In comparison with PDLC, the liquid crystal in PNLC is not spherical (or ellipsoidal) droplets, but is distributed in a three-dimensional polymer network to form a continuous channel network. In case where a certain electrical signal is applied, the liquid crystal molecules with dielectric anisotropy are subjected to electric field torque, and their director direction will remain the same as the electric field, the incident light can transmit, and the PNLC film is in a bright state.

The polymer network stabilized liquid crystal film is a new type of photoelectric composite material in which a small amount of polymer forms a network to stabilize the orientation of liquid crystal. Unlike ordinary polymer dispersed liquid crystal film, since the refractive index changes due to different arrangement orientations of liquid crystal molecules in the polymer network, the PSLC film is in a transparent state when no electric field is applied. When a proper electric field is applied, due to the anchoring effect between the polymer network and the liquid crystal, the reorientation of some liquid crystals in the electric field will be restricted, so that the liquid crystal molecules are disorderly arranged, show different refractive indices, and scatter the incident light to cause the PSLC film to be in a fuzzy state. The regulating method and the regulating device 100 according to embodiments of the present disclosure may be applied to the electric control functional layer 201 based on the above-mentioned liquid crystal material, resulting in a wider application range.

A suspended particle device (also referred to a light valve) is a film in which liquid suspension droplets are distributed. Light-absorbing particles are dispersed in a liquid suspension. These randomly-oriented microscopic particles are usually made of black ceramic pigments (iron chromium oxide, copper chromium oxide or bismuth manganese oxide). These particles can reflect heat, especially near infrared radiation. The film is encapsulated between two glass or plastic plates coated with a transparent conductive material. When there is no voltage; the particles absorb light and prevent the light from passing through the film. When a voltage is applied, the particles are re-arranged so that light may pass through. By using a simple switch or other control device to regulate the voltage, the user may immediately regulate the light, glare, and heat emitted by a product such as a window. This gives users a certain range of transparency, where the light transmittance may be quickly changed according to the applied electrical signal.

Figure 1:
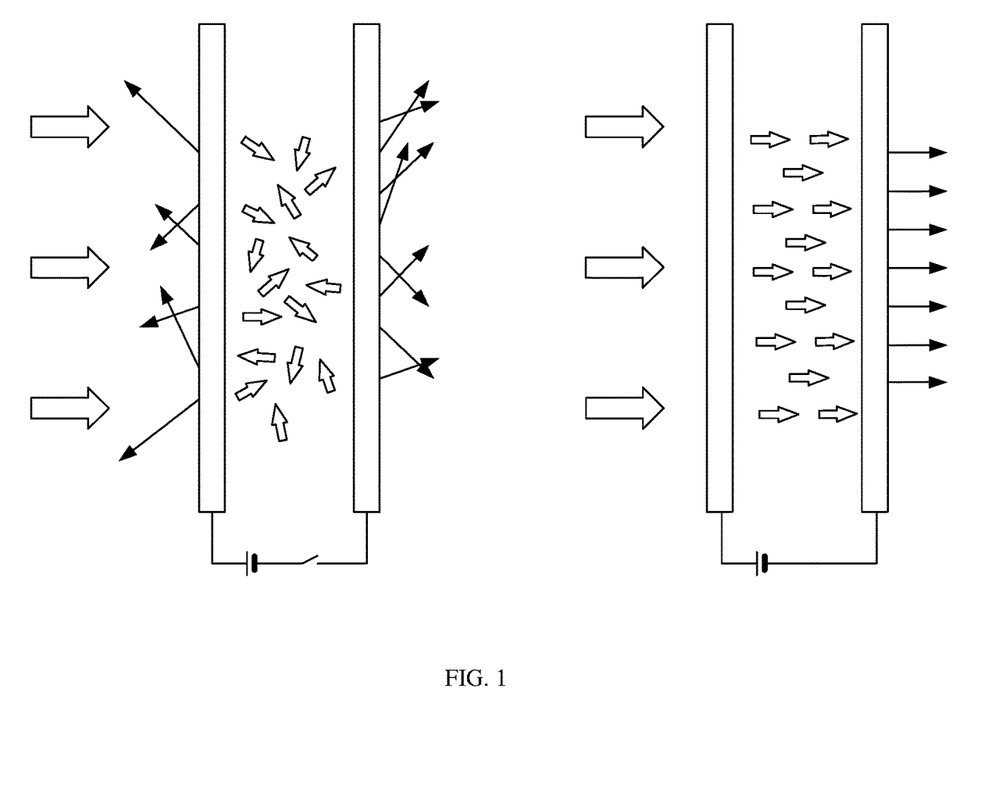
FIG. 1 illustrates a schematic diagram of a principle of changes of optical characteristics of a liquid crystal-based electric control functional layer.

In some embodiments, at least one of the electrochromic (EC) material, the electro-induced transparency-changing material, or the host-guest liquid crystal material mentioned above is forward, reverse, or bistable. Wherein "forward" means that as shown in FIG. 1, when a voltage is applied to the electric control functional layer 201, the electric control functional layer 201 will transit from an opaque state to a transparent state. The "reverse" is the opposite, that is, when a voltage is applied to the electric control functional layer 201, the electric control functional layer 201 will transit from a transparent state to an opaque state. In the above two cases, the electric control functional layer 201 will return to the original opaque or transparent state after the applied voltage is removed.

"Bistable" means that even if the applied voltage is removed, the electric control functional layer 201 will remain in the state when the voltage is applied. For example, in case where the haze of the electric control functional layer 201 becomes 50% when a voltage of a certain amplitude and frequency is applied, even if the voltage is removed, the "bistable" electric control functional layer 201 will continue to maintain the haze, until the voltage of other amplitude and frequency acts on it. Therefore, the use of bistable liquid crystal materials can achieve more stable and energy-saving control.

It should be noted that in the following, the concept of the present disclosure will be described mainly by taking the electric control functional layer 201 comprising forward polymer dispersed liquid crystal as an example. For the case where the electric control functional layer 201 comprises the above-mentioned other materials, the principle is the same, and will not be repeated in the following.

Figure 3:
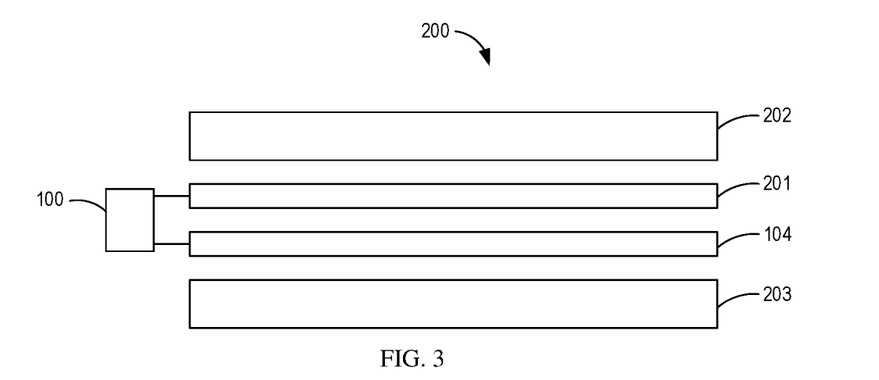
FIG. 3 illustrates a schematic diagram of a functional glass according to embodiments of the present disclosure.

FIG. 3 shows an example in which such an electric control functional layer 201 is applied to glass to form a functional glass 200. The glass comprises a first glass 202 and a second glass 203 arranged on both sides of the electric control functional layer 201. Both the first glass 202 and the second glass 203 are single-layer glass. In the production process, various types of glass produced by existing different technologies, such as float glass, flat glass, tempered glass or the like, may be used. The shapes of the first glass 202 and the second glass 203 may be flat glass or curved glass with a certain curvature. The first glass 202 and the second glass 203 have certain transparency.

The electric control functional layer 201 is arranged between the first glass 202 and the second glass 203. By changing any one of the light transmittance, haze, color, or degree of coloring of the electric control functional layer 201, the light transmittance, haze, color, or degree of coloring of the functional glass 200 will also be changed accordingly.

Certainly, it should be appreciated that in addition to the arrangement manner shown in FIG. 3, the electric control functional layer 201 may also be arranged on the glass in other ways. For example, in some embodiments, the electric control functional layer 201 may also be arranged on the glass in multiple sections. For example, in some embodiments, the functional glass 200 may comprise a plurality of electric control functional layers 201 which are arranged between the glasses in a certain pattern. By separately controlling the plurality of electric control functional layers 201 to present different changes in light transmittance, haze, color or degree of coloring, the functional glass 200 as a whole may present different patterns or textures, such as gradation patterns.

In addition to being arranged between the glasses, in some embodiments, the electric control functional layer 201 may also be arranged on a side of the functional glass 200 by way of an adhesive, for example. In addition, in some alternative embodiments, the electric control functional layer 201 may also be used alone.

Figure 4:
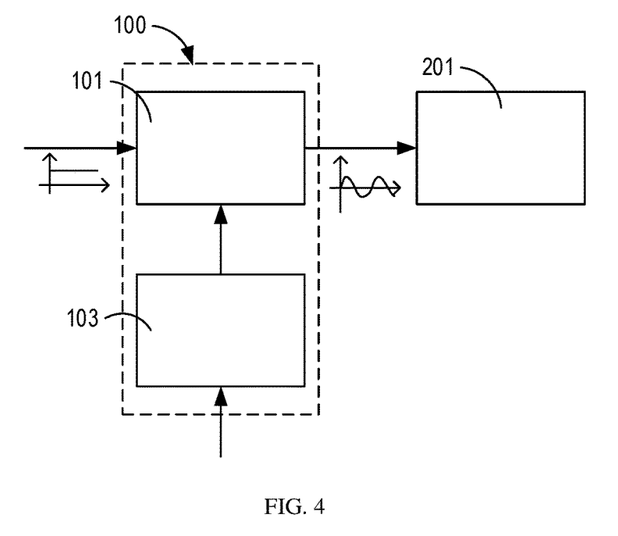
FIG. 4 illustrates a schematic diagram of a regulating device according to embodiments of the present disclosure.

Next, how to regulate the above-mentioned electric control functional layer 201 by the regulating device 100 according to embodiments of the present disclosure will be described. FIG. 4 shows a schematic diagram of the regulating device 100. As shown, in general, the regulating device 100 according to embodiments of the present disclosure comprises a voltage regulator 101 and a controller 103. The regulating device 100 may be applied to any appropriate occasions where it can control the electrical signals acting on the electric control functional layer 201, for example, applied in vehicles such as automobiles, trains, ships, aircrafts or the like, or inside buildings or the like.

The voltage regulator 101 may be coupled to, for example, a power supply on an automobile to receive an input voltage. The voltage regulator 101 may regulate the amplitude and frequency of the input voltage to generate an electric signal which is to act on the electric control functional layer 201. For example, the voltage regulator 101 may convert a DC power input from the automobile power supply into an AC power or an electrical signal with a certain frequency and amplitude, as shown in FIG. 4.

The above describes the case where the voltage connected to the voltage regulator 101 is, for example, the DC voltage of an automobile. For the case where the electrical signal is alternating current, in some embodiments, the alternating current may refer to alternating current having a sinusoidal waveform. In some alternative embodiments, the alternating current acting on the electric control functional layer 201 may also have at least one of a square wave, a triangular wave, a trapezoidal wave, or any other appropriate waveform.

Certainly, it should be appreciated that when the regulating device 100 is applied in a building with AC power, the voltage regulator 101 may also directly regulate the amplitude and frequency of the input AC power to generate the alternating current which will act on the electric control functional layer 201.

The controller 103 is coupled to the voltage regulator 101, and can receive a regulating signal and control the voltage regulator 101 according to the regulating signal to regulate the amplitude and frequency of the input voltage. Specifically, the controller 103 sends a control signal including an amplitude parameter and a frequency parameter of the voltage to the voltage regulator 101 according to the regulating signal to regulate the amplitude and frequency of the input voltage. In this way, the electric control functional layer 201 may be regulated as needed with the regulating signal.

Besides referring to a target amplitude and a target frequency corresponding to target characteristics such as optical characteristics to be regulated by the electric control functional layer 201, the amplitude parameter and frequency parameter of the voltage mentioned herein further comprise all process amplitude parameters and process frequency parameters needed for the regulation from initial characteristics to target characteristics. For example, the control signal sent by the controller 103 not only comprises the target amplitude and target frequency corresponding to the target characteristics to be regulated, but also comprises the process amplitude parameters and frequency parameters corresponding to a regulating mode (e.g., a gradual regulation mode or an abrupt-change regulation mode) and required in the change from the initial amplitude and frequency to the target amplitude and frequency. It should be appreciated that the process amplitude parameter and the frequency parameter may be obtained in any appropriate manner such as manual preset, calculation according to a specific functional relationship, which will not be described in detail in the following.

Different from conventional solutions, the regulating device 100 according to embodiments of the present disclosure may simultaneously control the amplitude and frequency of the input voltage to regulate the electric control functional layer 201 more finely. For example, in the conventional solutions with amplitude regulation only, the haze may only be regulated with a gradation of 10% or even 20% near a voltage between about 5V and 15V. In the regulating device 100 according to embodiments of the present disclosure, the optical characteristics such as the haze of the electric control functional layer 201 may achieve finer regulation with a gradation of 5% or even less than 1%. That is to say, the user may incrementally or degressively regulate the transparency of the glass with the gradation of 5% or even less than 1%, thereby bringing about more diversified regulating options to users.

Such a more diversified and finer regulation can bring about a more comfortable experience to the human senses. That is, the user's experience is improved. At the same time, the realization of this fine regulation may enable more diversified control of the electric control functional layer 201, which will be further discussed later.

In addition, the realization of the fine regulation also enables the electric control functional layer 201 to be regulated in any appropriate manner or mode. For example, in some embodiments, the electric control functional layer 201 may be regulated linearly gradually, abruptly, or in any desired mode at a certain transition rate. For example, the electric control functional layer 201 may also be regulated in a curve gradual regulation mode (i.e., at a changing transition rate). The curve gradual regulation mode is similar to the linear gradual regulation mode, as long as a corresponding transition rate parameter is duly set, which will be further discussed in the following. To facilitate understanding, the following will mainly take the linear gradual regulation mode as an example to describe the concept of the present disclosure, and other regulation modes are similar to the linear gradual regulation mode and will not be described in detail hereunder.

How such desired regulation is implemented will be described hereunder with the changes of the haze. The principles for the light transmittance, color or degree of coloring are similar to that for the haze.

As mentioned above, when the haze of the electric control functional layer 201 is changed only by regulating the amplitude of the voltage, the change tendency of the haze presents the curve shown in FIG. 2. According to the Inventor's discovery from research, the lower the frequency of the voltage applied to the electric control functional layer 201, the lower the haze. As the frequency increases, the haze will gradually increase, and the electric control functional layer 201 will change from transparent to opaque.

With this discovery, for example, in order to achieve fine regulation of the optical characteristics of the electric control functional layer 201, in an area where the haze changes greatly relative to the amplitude of the voltage (e.g., the area between 5V~15V as shown in FIG. 2), the degree of such transition of the haze (namely, the transition rate) can be effectively flattened (namely, the transition rate becomes smaller) by increasing the frequency of the voltage. Likewise, in areas where the haze changes small relative to the amplitude of the voltage (e.g., areas below 5V and above 15V as shown in FIG. 2), the transition rate is increased by decreasing the frequency of the voltage.

It may be seen that the regulating device according to embodiments of the present disclosure realizes fine regulation of the electric control functional layer 201 by making the control signal comprise the amplitude parameter and frequency parameter of the voltage.

For example, on an occasion with strong external light, after a user gives an instruction to make the functional glass 200 become transparent, it is possible to set a small transition rate of the change in optical characteristics, i.e., to make the functional glass 200 transit to transparent slowly, to enable the user to adapt the transition. In some embodiments, when the user regulates the haze with a button, for example, the transition rate may be made larger, so that the haze changes quickly.

In addition to comprising the amplitude parameter and frequency parameter of the voltage, the control signal may additionally or alternatively comprise at least one of a waiting time parameter for the electric control functional layer 201 to activate the transition or a transition rate parameter at which the electric control functional layer 201 transitions in some embodiments. Such a configuration enables the regulating device 100 to further improve user experience.

For example, mis-regulation caused by user's mis-operation can be effectively prevented by setting a waiting time. That is, a user may adjust his/her input error within the waiting time so that the electric control functional layer 201 may be regulated in a correct and desired manner. For example, taking the forward PDLC as an example and assuming that a user expects to achieve a semi-transparent effect, that is, the target light transmittance equals to 50%, it may be determined by setting the waiting time to 2 seconds that the electric control functional layer is energized after 2 seconds or the electric control functional layer is applied with the target voltage amplitude and frequency after 2 seconds. Such a setting can effectively prevent mis-operation, that is, the user can completely change the possible mis-operation within the 2 seconds. At the same time, setting the waiting time may also meet a user's different needs and improve user experience. For example, when a user presses the button, the optical characteristics may be regulated abruptly after waiting for a predetermined waiting time, to improve the user experience.

The finer regulation of the electric control functional layer 201 is also embodied in the capability of regulating the transition rate of the electric control functional layer 201 as needed. As mentioned above, the transition rate may be regulated according to the user's preferences or automatically regulated according to the intensity of the external light or the like. In addition, in the case of implementing fine regulation, the transition rate may be set to be larger, smaller or variable as needed (that is, corresponding to the curve gradual regulation mode described in the preceding text). For example, in some embodiments, the abrupt-change mode may be achieved by making the above-mentioned transition rate larger. For example, if the control signal sent by the controller 103 according to the regulating signal is to change the haze from 50% to 0 within the one-second transition time in the abrupt-change mode, the sent control signal comprises the transition rate for implementing the change and the desired amplitude and frequency of the voltage corresponding thereto, thereby achieving the above function. In addition, in some alternative embodiments, the abrupt-change mode may also refer to directly regulating the amplitude and frequency of the voltage to the amplitude and frequency corresponding to the required optical characteristics after the predetermined waiting time.

The above-mentioned control signal may be sent by the controller 103 in any suitable manner. For example, in some embodiments, these control signals may be built in a memory or controller 103 of the regulating device 100 when the functional glass 200 is shipped or the regulating device 100 is shipped. For example, the corresponding parameters may be set according to the requirements put forward by the customer, and the control signal may be built in the controller 103 or a memory coupled thereto. Thus, the controller 103 may send a built-in control signal to regulate the electric control functional layer 201 according to the received regulating signal.

In some embodiments, the regulating signal received by the controller 103 may be provided to the controller 103 through an interaction unit 104. In other words, the regulating device 100 may further comprise the interaction unit 104. The interaction unit 104 is coupled to the controller 103 and can receive user's instructions and provide the regulating signals to the controller 103 according to the user's instructions.

For example, in some embodiments, as shown in FIG. 3, the interaction unit 104 may be a touch device integrated into the functional glass 200. The touch device may be a strip-shaped touch device arranged on a surface of the glass or between the glasses. For example, the user may slide a finger from one end of the strip-shaped touch device to the other end (for example, from left to right or from bottom to top) to realize the function of increasing the haze of the functional glass 200. When a user wants to reduce the haze, he/she may slide his/her finger from right to left or from top to bottom on the strip-shaped touch device. In other words, the user's instructions may be input through the touch device.

In addition, the touch device may adopt various touch technologies, such as, but not limited to, capacitive touch, resistive touch, surface acoustic wave touch, or infrared touch.

In addition to the one-way sliding mentioned above, the touch device may also receive a touch gesture and provide the regulating signal according to the touch gesture. For example, in some embodiments, the touch device may receive a plurality of touch gestures, and each touch gesture corresponds to a predetermined level of the haze or light transmittance. For example, a double-tap touch gesture corresponds to a haze value of 100%, that is, double-tapping the touch device will make the electric control functional layer 201 present an opaque state. For example, the haze value of the electric control functional layer 201 may be changed stepwise by a multi-tap touch gesture. For example, with each tap, the haze increases by 10%, so that the haze value switches cyclically between 0%, 10%, 20%, . . . , and 100%. That is to say, the electric control functional layer 201 switches gradually and cyclically between the transparent state and the opaque state.

It should be appreciated that the foregoing embodiments where the interaction unit 104 is a touch device are only illustrative and are not intended to limit the scope of the present disclosure. Any other suitable manners or means are also possible. For example, in some embodiments, the interaction unit 104 may also comprise but is not limited to: at least one of a light sensor, a gesture sensor, a voice sensor, a regulating knob, an operating button, or an operating handle.

For example, in some embodiments, the interaction unit 104 may be a voice sensor. For example, if a user wants to increase the haze of the functional glass when driving, he/she only needs to say "increase the haze" or other similar voice control commands. The voice command can be captured by the voice sensor. The voice sensor is coupled to a controller on the automobile or has a controller itself, and the controller can parse and decode the voice command and convert it into a regulating signal that can be recognized by the controller 103 of the regulating device 100. Thus, the controller 103 may increase the haze of the electric control functional layer 201 according to the regulating signal.

Since the linear gradual regulation of the haze is realized, during linear changing of the haze according to a user's voice control command, if the user feels the current haze is more comfortable, he/she may stop the change of the haze through the voice sensor at any time. For example, in case where a user wants to increase the haze to 80% through voice control, when the haze is changing and changing to 50%, which makes the user feel just proper, he/she may stop the change of the haze through voice control and keep the haze at the desired 50%. Therefore, it can be seen that through linear gradual regulation and appropriate interaction means, diversified control is achieved and user experience is improved.

Hereinafter, a circuit that performs the above-mentioned functions will be described by way of example. In order to achieve the regulation of the amplitude and frequency of the voltage, in some embodiments, the voltage regulator 101 may comprise a frequency regulating unit and an amplitude regulating unit to regulate the amplitude and frequency, respectively. In other words, the above-mentioned amplitude and frequency regulations may be performed sequentially or simultaneously. It should be appreciated that the realization of the above function is not affected whether the amplitude of the voltage is regulated first, the frequency of the voltage is regulated first, or both are regulated together.

For example, in case where the regulating device is applied in a building, since AC power is usually used in the building, the frequency regulating unit may first regulate the frequency of the input voltage to generate a first intermediate voltage, and then the amplitude regulating unit coupled between the frequency regulating unit and the electric control functional layer 201 regulates an amplitude of the first intermediate voltage to generate a voltage acting on the electric control functional layer 201.

In some alternative embodiments, when the regulating device 100 is applied in an environment with a DC power supply, for example in an automobile, the amplitude regulating unit may first regulate the amplitude of the input voltage to generate a regulated second intermediate voltage. A frequency of the second intermediate voltage is regulated by the frequency regulating unit coupled between the amplitude regulating unit and the electric control functional layer 201 to generate a voltage acting on the electric control functional layer 201.

Certainly, it should be appreciated that embodiments of the above mentioned two types of regulation are only illustrative and are not intended to limit the scope of the present disclosure. Any other suitable regulating manners are also possible. For example, in some embodiments, the voltage regulator 101 may also consist of only one module, thereby implementing simultaneous regulation of the frequency and the amplitude.

Figure 5:
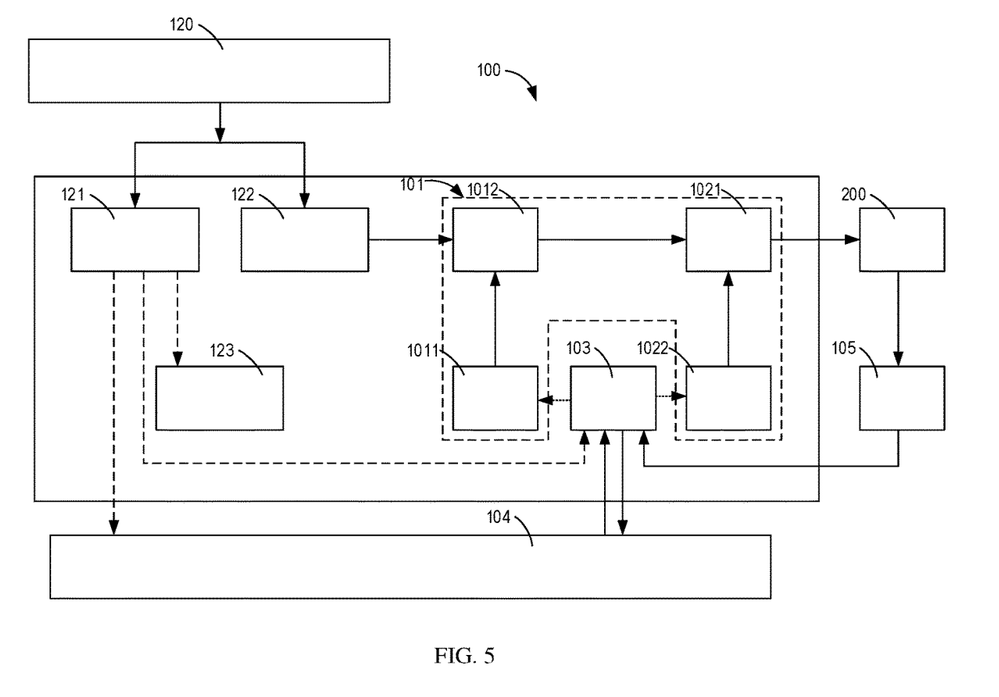
FIG. 5 illustrates a schematic diagram of a regulating device according to other embodiments of the present disclosure.

In some embodiments, the frequency regulating unit may comprise an H-bridge circuit 1021 and a pulse width modulation circuit 1022, as shown in FIG. 5. The H-bridge circuit 1021 is a circuit capable of inverting loads connected thereto or voltages at both ends of the output terminal. The transition from DC to AC and the regulation of the AC frequency can be implemented by controlling a switch (for example, a triode) in the circuit to regularly achieve voltage inversion at the output terminal. For example, the pulse width modulation circuit 1022 coupled to the H-bridge circuit 1021 and the controller 103 may control the switch in the H-bridge circuit 1021 according to the frequency parameter.

In this way, the frequency of the voltage output by the H-bridge circuit 1021 is made correspond to the frequency parameter. In some embodiments, the pulse width modulation circuit 1022 may cause the H-bridge circuit to output at least one of a square wave, a sine wave, a triangular wave or a trapezoidal wave. Certainly, in addition to the regulation by the pulse width modulation circuit, in some alternative embodiments, the H-bridge circuit 1021 may also be implemented by using an approximate square wave control or a cascaded multi-level control method.

Certainly, it should be appreciated that the above-mentioned embodiments of regulating the frequency through the H-bridge circuit 1021 and appropriate regulating means are only illustrative and are not intended to limit the scope of the present disclosure. Any other suitable means are also possible. For example, in some embodiments, additionally or alternatively, the frequency regulating unit may also comprise a frequency converter.

For the amplitude regulating unit, in some embodiments, the amplitude regulating unit may comprise a converter 1012 and a digital potentiometer 1011. The digital potentiometer 1011 is coupled between the controller 103 and the converter 1012. The converter 1012 may be a DC converter. In some alternative embodiments, the converter 1012 may also be a DC-AC converter or an AC converter.

The digital potentiometer 1011 can control the converter 1012 according to the amplitude parameter, so that the converter 1012 generates the second intermediate voltage based on the input voltage or generates a voltage of a predetermined amplitude acting on the electric control functional layer 201 based on the first intermediate voltage.

Certainly, it should be appreciated that the above-mentioned embodiment regarding the amplitude regulating unit including the converter 1012 and the digital potentiometer 1011 is merely illustrative and is not intended to limit the scope of the present disclosure. Any other suitable means are also possible. For example, in some embodiments, additionally or alternatively, the amplitude regulating unit may also comprise an RC bridge oscillator circuit.

FIG. 5 shows a schematic diagram of a circuit capable of realizing the above-mentioned functions. The circuit for example may be implemented on an automobile, so that the functions may be realized on the automobile. The controller 103 and the voltage regulator 101 mentioned above may be arranged on a circuit board. In addition to the above two portions, the circuit board may further comprise a boost unit 122 which may be arranged between the voltage regulator 101 (for example, the converter 1012) and the automobile power supply 120 to boost the automobile power supply voltage (usually 12V) to a voltage needed to control the electric control functional layer 201.

In addition, in some embodiments, the circuit board may further comprise a buck converter 121, which may step down the automobile power supply voltage into a digital input voltage (for example, generally 5V), thereby powering the controller 103, the interaction unit 104, and/or other chips 123. The arrow direction in FIG. 5 refers to an inflow direction of the electrical signal. It is noted that photoelectric isolation circuits may be used between some components, for example between the buck converter 121 and other chips 123, between the controller 103 and the interaction unit 104, and between the controller 103 and the digital potentiometer 1011 and the pulse width modulation circuit 1022. This can effectively avoid interference between high-voltage and low-voltage modules on the circuit board, thereby improving the stability of control.

In addition to the above-mentioned components, additionally or alternatively, in some embodiments, the regulating device 100 may further comprise an optical sensor 105, as shown in FIG. 5. The optical sensor 105 can detect the optical characteristics of the electric control functional layer 201 and generate a detection signal representing the detected optical characteristics. This makes it possible to achieve the feedback control during the regulation of the electric control functional layer 201.

For example, in some embodiments, the controller 103 may be coupled to the optical sensor 105, and may determine an optical difference according to the detection signal and the regulating signal. The optical difference here means the difference between the optical characteristics to be achieved and the optical characteristics detected. If there is the optical difference, it means that the required optical characteristics have not been achieved through the regulating. At this time, the controller 103 may control the voltage regulator 101 to further regulate at least one of the amplitude and the frequency based on the optical difference to finally realize the predetermined optical characteristics.

More precise regulation of the electric control functional layer 201 is realized by introducing the optical sensor 105. In addition, in some embodiments, the optical sensor 105 may also be coupled to a display unit to display the detection signal in the display unit, so that the user may have a more visual understanding of the current haze, thereby improving user experience.

In some embodiments, the optical sensor 105 may comprise a haze meter. The haze meter may be arranged at an appropriate position of the electric control functional layer 201 or the functional glass 200 to detect the haze of the electric control functional layer. Certainly, in some alternative embodiments, the optical sensor 105 may comprise a light intensity sensor that detects light intensity. Since changes in haze, light transmittance, color or degree of coloring will affect the changes in the light intensity, the detection signal regarding the optical characteristics of the functional glass 200 may be obtained in a cost-effective manner by detecting the changes in the light intensity near the functional glass 200.

Certainly, it should be appreciated that the above-mentioned embodiments in which the above-mentioned components are all arranged on a circuit board are only illustrative, and are not intended to limit the scope of the present disclosure. Any other suitable arrangements are also possible. For example, in some alternative embodiments, these components mentioned above may be arranged on different circuit boards respectively as required, and data connection may be performed in a wired connection manner or a wireless connection manner between these different circuit boards, and between the regulating device 100 and other control units (such as the control unit of an automobile).

The wired connection manner comprises but is not limited to a Controller Area Network (CAN) bus, a Local Interconnection Network (LIN) bus, a Serial Peripheral Interface (SPI), an Inter-Integrated Circuit (I2C) bus, a Universal Asynchronous Receiver-Transceiver (UART) etc. The wireless connection manner comprises but is not limited to at least one of WiFi, Bluetooth, Zigbee, Z-wave, Bluetooth Low Energy (BLE), 6LoWPAN, Near Field Communication (NFC), WiFi direct connection, Global System for Mobile Communications (GSM), LTE, a spread spectrum technology-based ultra-long-distance wireless transmission scheme (LoRa), a narrowband Internet of Things (NB-IoT), or LTE-M. In addition, in some alternative embodiments, the above-mentioned circuit(s) on the circuit board may be implemented in the form of a chip.

Figure 6:
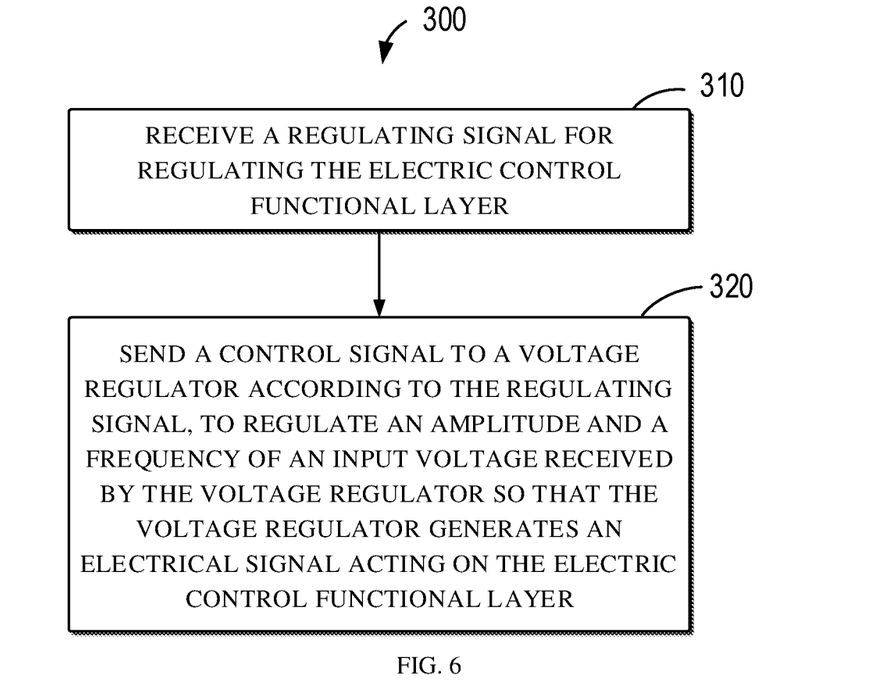
FIG. 6 illustrates a flowchart of a method for regulating an electric control functional layer according to embodiments of the present disclosure.

According to another aspect of the present disclosure, a method for regulating the electric control functional layer 201 is also provided. FIG. 6 shows a flowchart according to this method. As shown in FIG. 6, at 310, a regulating signal for regulating the electric control functional layer 103 is received. The regulating signal may be provided by the interaction unit 104 according to a user's instruction.

At 320, a control signal is sent to the voltage regulator 101 according to the regulating signal, to regulate the amplitude and frequency of the input voltage received from the voltage regulator 101 so that the voltage regulator 101 generates an electrical signal that will act on the electric control functional layer 201. The control signal comprises the amplitude parameter and frequency parameter of the voltage. In this way, more diversified control of the electric control functional layer 201 is achieved, and the user experience is improved.

In some embodiments, controlling the voltage regulator 101 according to the regulating signal comprises controlling the frequency regulating unit to regulate the frequency of the input voltage to generate the regulated first intermediate voltage and controlling the amplitude regulating unit coupled to the frequency regulating unit and the electric control functional layer to regulate the amplitude of the first intermediate voltage to generate the electric signal.

In some embodiments, controlling the voltage regulator 101 according to the regulating signal comprises controlling the amplitude regulating unit to regulate the amplitude of the input voltage to generate the regulated second intermediate voltage; and controlling the frequency regulating unit coupled to the amplitude regulating unit and the electric control functional layer to regulate the frequency of the second intermediate voltage to generate an electrical signal. These two control manners can enable the regulating device 100 to adapt for different environments, and improve the applicability of the regulating method and the regulating device 100.

In some embodiments, controlling the frequency regulating unit comprises controlling the pulse width modulation circuit coupled to the H-bridge circuit 1021 to control the switch in the H-bridge circuit 1021 according to frequency parameter, so that the H-bridge circuit 1021 generates the first intermediate voltage based on the input voltage or generates the electric signal based on the second intermediate voltage.

In some embodiments, controlling the amplitude regulating unit comprises: controlling the digital potentiometer 1011 to control the converter 1012 according to the amplitude parameter, so that the converter 1012 generates the second intermediate voltage based on the input voltage or generates the electric signal based on the first intermediate voltage. In this way, the regulation of the electric control functional layer 201 is achieved in a cost-effective manner.

In some embodiments, receiving the regulating signal comprises receiving the regulating signal from the interaction unit 104, wherein the interaction unit 104 can receive an instruction from a user and provide the regulating signal to the controller 103 according to the instruction from the user.

In some embodiments, the method may further comprise receiving a detection signal of the optical characteristics detected by the optical sensor 105; determining an optical difference based on the detection signal and the regulating signal, and controlling the voltage regulator 101 based on the optical difference to further regulate at least one of the amplitude and frequency to regulate the electric control functional layer 201.

The above method may be stored in a computer readable medium in a form of a computer program which may be executed by the above-mentioned controller 103 to perform the above actions.

Another aspect of the present disclosure further provides a functional glass 200, as shown in FIG. 3. In addition to a glass substrate (for example, the first glass 202 and/or the second glass 203 mentioned above), the functional glass 200 further comprises the electric control functional layer 201 and the regulating device 100 described above. In some embodiments, the functional glass 200 may also be integrated with the interaction unit 104 mentioned above. The regulating device 100 is coupled to the interaction unit 104 and the electric control functional layer 201. The electric control functional layer 201 may be integrated between the first glass 202 and the second glass 203 by laminating to form a laminated glass.

It should be appreciated that, according to embodiments of the present disclosure, the regulating device 100 may be integrated in the functional glass 200 together with the interaction unit 104, or may also constitute an integrated component with the interaction unit 104, or may also constitute an integrated component with the functional glass 200. The regulating device 100 may also be located outside both the functional glass 200 and the interaction unit 104 as an independent component.

As can be seen from the above, the regulating device 100 and the regulating method and the functional glass 200 according to embodiments of the present disclosure enable the parameters such as the haze of the electric control functional layer to be regulated in a more diversified and finer manner along with the changes of the electrical signal such as the amplitude and frequency of the voltage, and therefore may provide the user with more options. In addition, the present disclosure also implements multiple regulating modes for controlling the optical characteristics, such as linear gradation mode, curved gradation mode, or abrupt-change mode. Such more diversified regulating modes can bring a more comfortable experience to human senses. At the same time, the realization of such a linear regulation enables more diversified control of the electric control functional layer 201, and improves the user experience.

It should be appreciated that the above description of the various embodiments of the present disclosure have been presented for purposes of illustration or explanation about principles of the present disclosure, without suggesting limitations to the present disclosure. Hence, any modification, equivalent substitution, improvement, and the like, within the spirit and principles of the present disclosure shall fall into the protection scope of the present disclosure. Furthermore, the appended claims are intended to cover all changes and modifications falling into the scope and boundaries equivalent to the scope and boundary thereof.

What is claimed is:

1. A regulating device for regulating an electric control functional layer, comprising:
    a voltage regulator configured to receive an input voltage and to regulate an amplitude and a frequency of the input voltage to generate an electrical signal acting on the electric control functional layer, wherein the voltage regulator comprises:
    a frequency regulating unit configured to regulate the frequency of the input voltage according to the frequency parameter to generate a regulated first intermediate voltage; and
    an amplitude regulating unit coupled to the frequency regulating unit and the electric control functional layer and configured to regulate an amplitude of the first intermediate voltage according to the amplitude parameter to generate the electric signal; and
    a controller coupled to the voltage regulator and configured to receive a regulating signal, and to send a control signal to the voltage regulator according to the regulating signal to regulate the amplitude and the frequency of the input voltage, the control signal comprising an amplitude parameter and a frequency parameter of the voltage, wherein the controller is configured to provide the control signal to provide a target amplitude parameter and a target frequency parameter, wherein the target frequency parameter is selected to adjust a transition rate of change of an optical characteristic of the electric control functional layer produced by the target amplitude parameter.

2. The regulating device of claim 1, wherein the control signal further comprises: at least one parameter of a waiting time parameter for the electric control functional layer to activate a transition or a transition rate parameter of the electric control functional layer.

3. The regulating device of claim 1, wherein the voltage regulator comprises:
    an amplitude regulating unit configured to regulate the amplitude of the input voltage according to the amplitude parameter to generate a regulated second intermediate voltage; and
    a frequency regulating unit coupled to the amplitude regulating unit and the electric control functional layer and configured to regulate a frequency of the second intermediate voltage according to the frequency parameter to generate the electric signal.

4. The regulating device of claim 3, wherein the frequency regulating unit comprises:
    an H-bridge circuit; and
    a pulse width modulation circuit coupled to the H-bridge circuit and the controller and configured to control a switch in the H-bridge circuit according to the frequency parameter to cause the H-bridge circuit to generate the first intermediate voltage based on the input voltage or to generate the electrical signal based on the second intermediate voltage.

5. The regulating device of claim 3, wherein the amplitude regulating unit comprises:
    a converter; and
    a digital potentiometer coupled to the converter and the controller and configured to control the converter according to the amplitude parameter to cause the converter to generate the second intermediate voltage based on the input voltage or to generate the electrical signal based on the first intermediate voltage.

6. The regulating device of claim 1, wherein the electrical signal is used to regulate an optical characteristic of the electric control functional layer.

7. The regulating device of claim 6, wherein the optical characteristic comprises at least one of haze, light transmittance, color, or degree of coloring.

8. The regulating device of claim 1, further comprising an interaction unit coupled to the controller and configured to receive an instruction from a user and to provide the regulating signal to the controller according to the instruction from the user.

9. The regulating device of claim 8, wherein the interaction unit comprises at least one of a touch device, a light sensor, a gesture sensor, a voice sensor, a regulating knob, an operating button or an operating handle.

10. The regulating device of claim 4, wherein the pulse width modulation circuit is configured to cause a waveform output by the H-bridge circuit to comprise at least one of a square wave, a sine wave, a triangular wave or a trapezoidal wave.

11. The regulating device of claim 1, further comprising:
an optical sensor configured to detect an optical characteristic of the electric control functional layer and to generate a detection signal representing the detected optical characteristic.

12. The regulating device of claim 11, wherein the controller is coupled to the optical sensor and is further configured to determine an optical difference based on the detection signal and the regulating signal, and to control the voltage regulator based on the optical difference to further regulate at least one of the amplitude and the frequency.

13. The regulating device of claim 11, wherein the optical sensor comprises a haze meter.

14. A method for regulating an electric control functional layer, comprising:
receiving a regulating signal for regulating the electric control functional layer; and
sending a control signal to a voltage regulator according to the regulating signal, wherein the voltage regulator comprises:
a frequency regulating unit configured to regulate the frequency of the input voltage according to the frequency parameter to generate a regulated first intermediate voltage; and
an amplitude regulating unit coupled to the frequency regulating unit and the electric control functional layer and configured to regulate an amplitude of the first intermediate voltage according to the amplitude parameter to generate the electric signal,
to regulate an amplitude and a frequency of an input voltage received by the voltage regulator so that the voltage regulator generates an electrical signal acting on the electric control functional layer, the control signal comprising an amplitude parameter and a frequency parameter of the voltage, wherein the control signal is based on a target amplitude parameter and a target frequency parameter, wherein the target frequency parameter is selected to adjust a transition rate of change of an optical characteristic of the electric control functional layer produced by the target amplitude parameter.

15. The method of claim 14, wherein controlling the voltage regulator according to the regulating signal comprises:
controlling a frequency regulating unit to regulate the frequency of the input voltage to generate a regulated first intermediate voltage; and
controlling an amplitude regulating unit coupled to the frequency regulating unit and the electric control functional layer to regulate an amplitude of the first intermediate voltage to generate the electric signal.

16. The method of claim 14, wherein controlling the voltage regulator according to the regulating signal comprises:
controlling an amplitude regulating unit to regulate the amplitude of the input voltage to generate a regulated second intermediate voltage; and
controlling a frequency regulating unit coupled to the amplitude regulating unit and the electric control functional layer to regulate a frequency of the second intermediate voltage to generate the electrical signal.

17. The method of claim 16, wherein controlling the frequency regulating unit comprises: controlling a pulse width modulation circuit coupled to a H-bridge circuit to control a switch in the H-bridge circuit according to the frequency parameter, so that the H-bridge circuit generates the first intermediate voltage based on the input voltage or generates the electric signal based on the second intermediate voltage.

18. The method of claim 16, wherein controlling the amplitude regulating unit comprises: controlling a digital potentiometer to control the converter according to the amplitude parameter, so that the converter generates the second intermediate voltage based on the input voltage or generates the electric signal based on the first intermediate voltage.

19. The method of claim 14, wherein receiving the regulating signal comprises receiving the regulating signal from an interaction unit, wherein the interaction unit is configured to receive an instruction from a user and to provide the regulating signal to the controller according to the instruction from the user.

20. The method of claim 14, further comprising:
receiving a detection signal of an optical characteristic detected by an optical sensor;
determining an optical difference based on the detection signal and the regulating signal; and
controlling the voltage regulator based on the optical difference to further regulate at least one of the amplitude and the frequency.

21. A functional glass, comprising:
a glass substrate;
an electric control functional layer; and
the regulating device according to claim 1.

22. The functional glass of claim 21, wherein the electric control functional layer comprises at least one of an electrochromic material, an electro-induced transparency-changing material, or a host-guest liquid crystal material.

23. The functional glass of claim 22, wherein the electro-induced transparency-changing material comprises one of suspended particle device (SPD), polymer dispersed liquid crystal (PDLC), polymer network liquid crystal (PNLC) and polymer stabilized liquid crystal (PSLC).

24. The functional glass of claim 22, wherein polymers in the electro-induced transparency-changing material are transparent or colored.

25. The functional glass of claim 22, wherein at least one of the electrochromic (EC) material, the electro-induced transparency-changing material or the host-guest liquid crystal material is forward, reverse, or bistable.

* * * * *